(12) United States Patent
Hsieh et al.

(10) Patent No.: US 8,254,145 B2
(45) Date of Patent: Aug. 28, 2012

(54) ELECTRONIC DEVICE WITH EXPANSION CARD MODULES

(75) Inventors: Chung-Cheng Hsieh, Taipei Hsien (TW); Ching-Wei Hsu, Taipei Hsien (TW); Li-Ping Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 255 days.

(21) Appl. No.: 12/698,997

(22) Filed: Feb. 2, 2010

(65) Prior Publication Data
US 2011/0116229 A1    May 19, 2011

(30) Foreign Application Priority Data
Nov. 16, 2009   (CN) .................. 2009 2 0314800 U

(51) Int. Cl.
*H05K 7/02*    (2006.01)
*H05K 7/04*    (2006.01)

(52) U.S. Cl. .................. 361/807; 361/801; 361/810

(58) Field of Classification Search .................. 361/807, 361/810, 796, 728–730, 752, 800–803; 312/223.1, 312/223.2
See application file for complete search history.

(56) References Cited

U.S. PATENT DOCUMENTS

| 5,338,214 | A | * | 8/1994 | Steffes et al. | ................. 439/160 |
| 5,544,006 | A | * | 8/1996 | Radloff et al. | ............ 361/679.32 |
| 6,118,668 | A | * | 9/2000 | Scholder et al. | ............... 361/753 |

* cited by examiner

*Primary Examiner* — Hung S Bui
(74) *Attorney, Agent, or Firm* — Altis Law Group, Inc.

(57) ABSTRACT

An electronic device includes a chassis having a bottom wall, a rear wall, and a sidewall perpendicular to each other. A motherboard is secured on the chassis bottom wall. A first socket is disposed on the motherboard. A mounting bracket is secured in the chassis above the motherboard. The mounting bracket includes a first mounting wall and a second mounting wall. The first mounting wall is parallel to and spaced from the sidewall of the chassis, and the second mounting wall is parallel to and spaced from the rear wall. A first riser card is coupled to the first socket on the motherboard, and is secured to the first mounting wall of the mounting bracket. An expansion card module is accommodated in the mounting bracket and parallel to the bottom wall of the chassis.

14 Claims, 4 Drawing Sheets

ELECTRONIC DEVICE WITH EXPANSION CARD MODULES

BACKGROUND

1. Technical Field

The present disclosure relates to electronic devices, and particularly, to an electronic device with modules for expansion cards.

2. Description of Related Art

Expansion cards may not have compatible form factors with computer enclosures. As a result, a riser card together with an extending chassis is adopted to secure the expansion card. Conventionally, the expansion cards are secured to the computer enclosure and coupled to a rear wall of the computer enclosure. However, sometimes, it may be desirable to mount expansion cards in a middle of the computer enclosure away from any supporting wall. For this, the conventional securing method will not work. Therefore, there is room for improvement.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
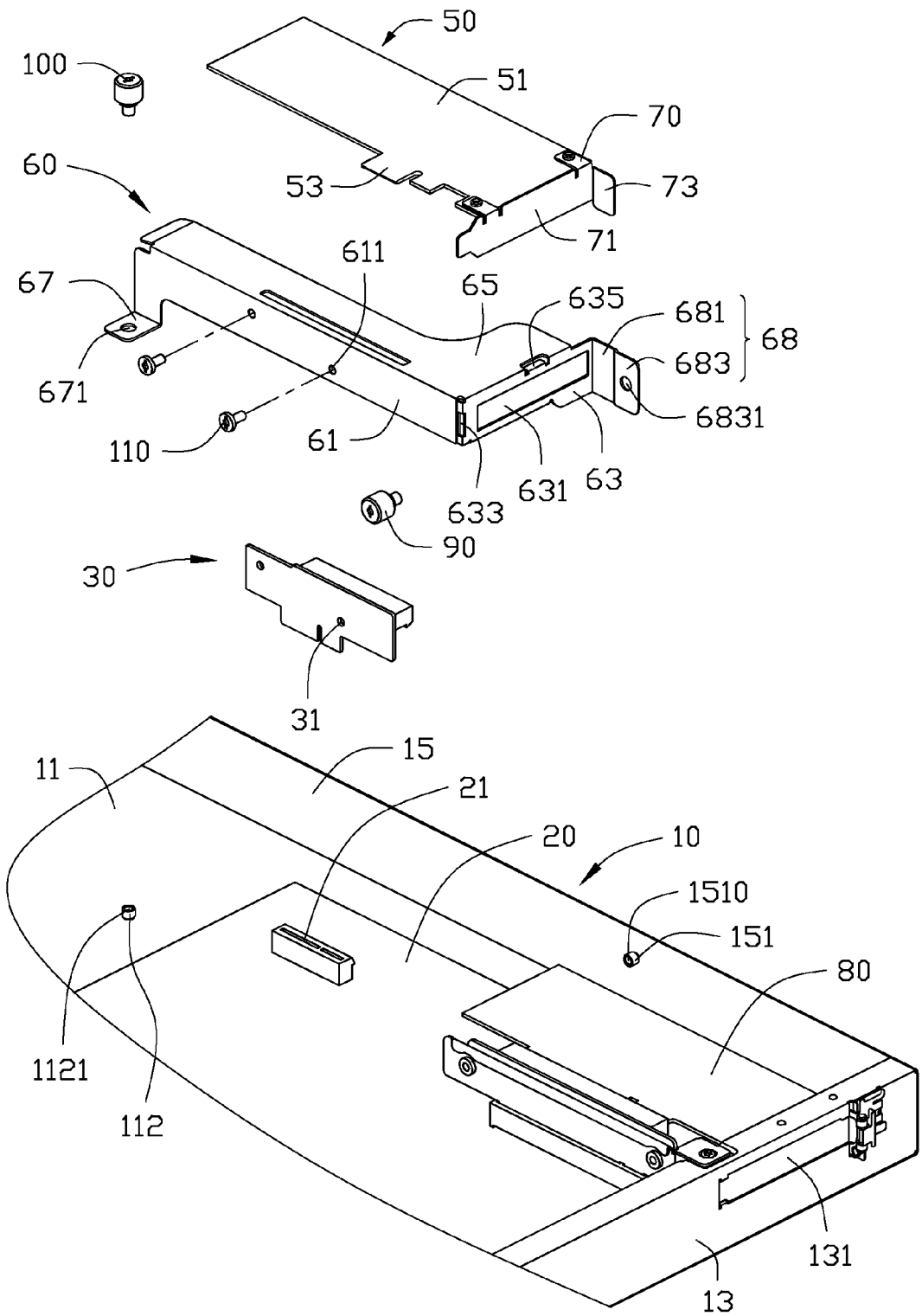
FIG. 1 is an exploded, cutaway, isometric view of an electronic device in accordance with one embodiment.
Figure 2:
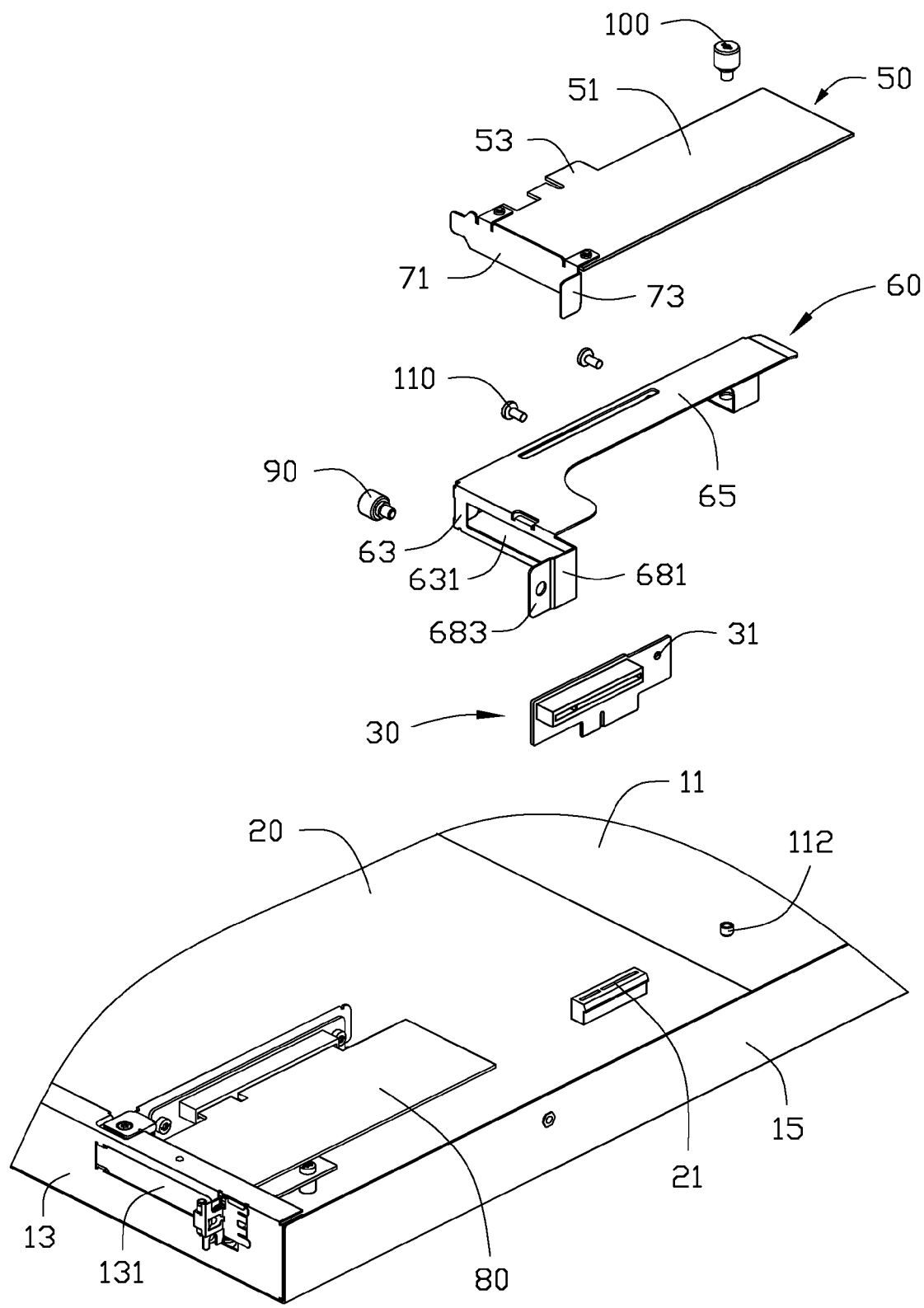
FIG. 2 is similar to FIG. 1, but viewed from another aspect.

Referring to FIGS. 1 and 2, an embodiment of an electronic device includes a chassis 10, a first expansion card module 50, and a mounting bracket 60 configured to secure the first expansion card module 50 in the chassis 10. The first expansion card module 50 includes a card body 51 and a fixing piece 70. A finger portion 53 extends from one side of the card body 51. The fixing piece 70 is secured to the main body 51 at another side adjacent to the finger portion 53. The fixing piece 70 includes a longitudinal base 71 and a bent tab 73 extending from the base 71.

The chassis 10 includes a bottom wall 11, a rear wall 13, and a sidewall 15. The bottom wall 11, the rear wall 13, and the sidewall 15 are perpendicular to each other. A motherboard 20 is mounted on the chassis bottom wall 11. An expansion slot 131 is defined in the chassis rear wall 13. A second expansion card module 80 is connected to the motherboard 20, and disposed adjacent to the chassis rear wall 13 and the sidewall 15. The second expansion card module 80 is coupled to the expansion slot 131 in the chassis rear wall 13. A first socket 21 is disposed on the motherboard 20, configured for a first riser card 30 to be inserted therein. The first riser card 30 defines two securing holes 31. A first securing post 112 extends from the chassis bottom wall 11. The first securing post 112 defines a first post hole 1121. A second securing post 151 extends from the chassis sidewall 15. The second securing post 151 defines a second post hole 1510.

Figure 3:
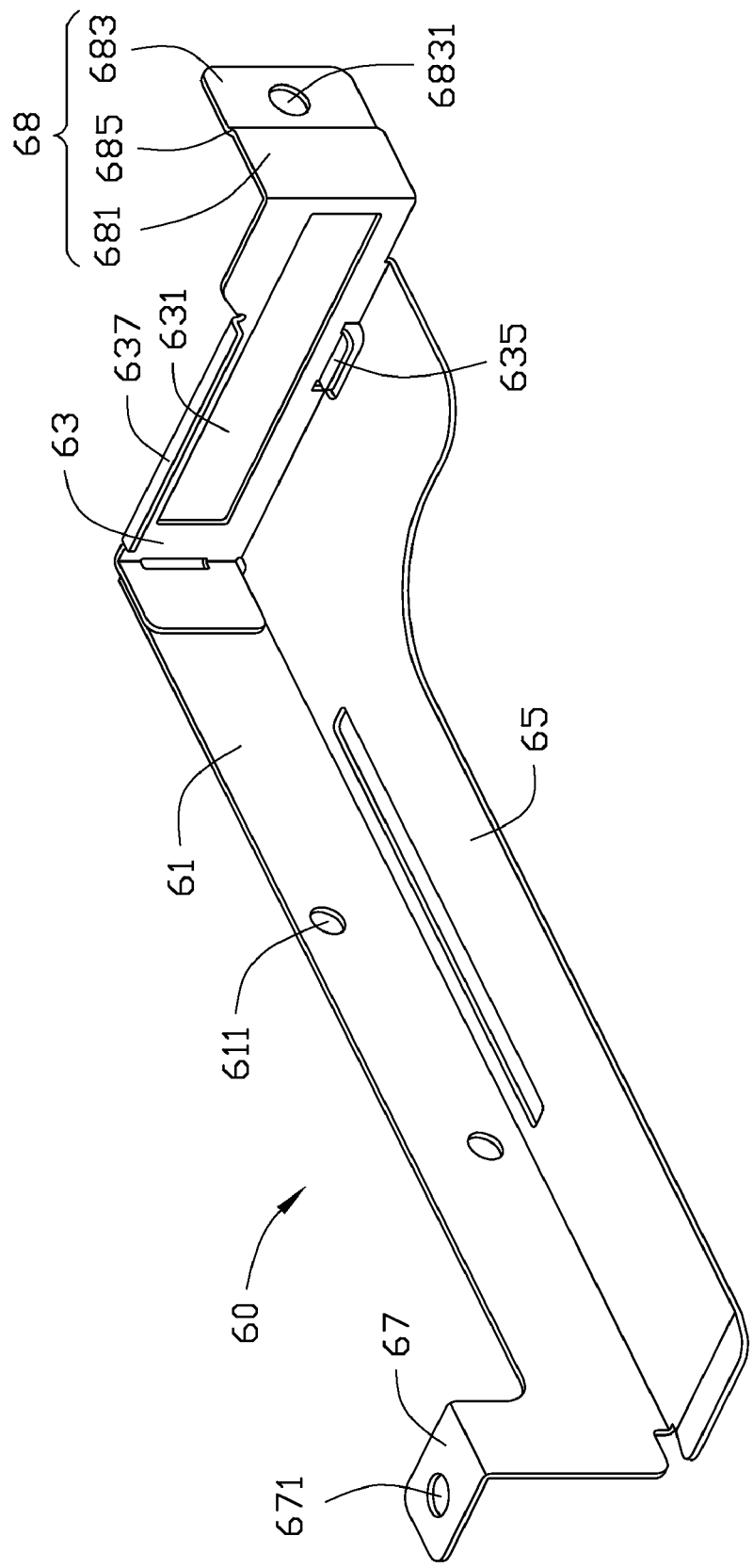
FIG. 3 is an enlarged view of a mounting bracket of FIG. 1.

Referring to FIG. 3, the mounting bracket 60 includes a first mounting wall 61, a second mounting wall 63, and a top wall 65 perpendicular to each other. Two mounting holes 611 are defined in the first mounting wall 61, corresponding to the securing holes 31 in riser card 30.

A first securing seat 67 extends from the first mounting wall 61. A first seat hole 671 is defined in the first securing seat 67, corresponding to the first post hole 1121 of the first securing post 112. A first expansion slot 631 is defined in the second mounting wall 63, configured to couple with electronic ports of the first expansion card module 50. A slot 633 (shown in FIG. 1) is defined at a joint of the first mounting wall 61 and the second mounting wall 63. The slot 633 is configured for the base 71 of the fixing piece 70 to be inserted therein. A blocking tab 635 extends from a top edge of the second mounting wall 63, and a supporting flange 637 (shown in FIG. 3) extends from a bottom flange of the second mounting wall 63.

A second securing seat 68 is bent from a side of the second mounting wall 63. The second securing seat 68 includes a pressing portion 681, a securing portion 683, and a step portion 685 connecting the pressing portion 681 and the securing portion 683. A second seat hole 6831 is defined in the securing portion 683, corresponding to the second post hole 1510 of the second securing post 151. When the mounting bracket 60 is secured in the chassis 10, the first mounting wall 61 is parallel to and spaced from the chassis sidewall 15, and the second mounting wall 63 is parallel to and spaced from the chassis rear wall 13. The second expansion card 80 is located between the chassis rear wall 13 and the second mounting wall 63 of the mounting bracket 60.

Figure 4:
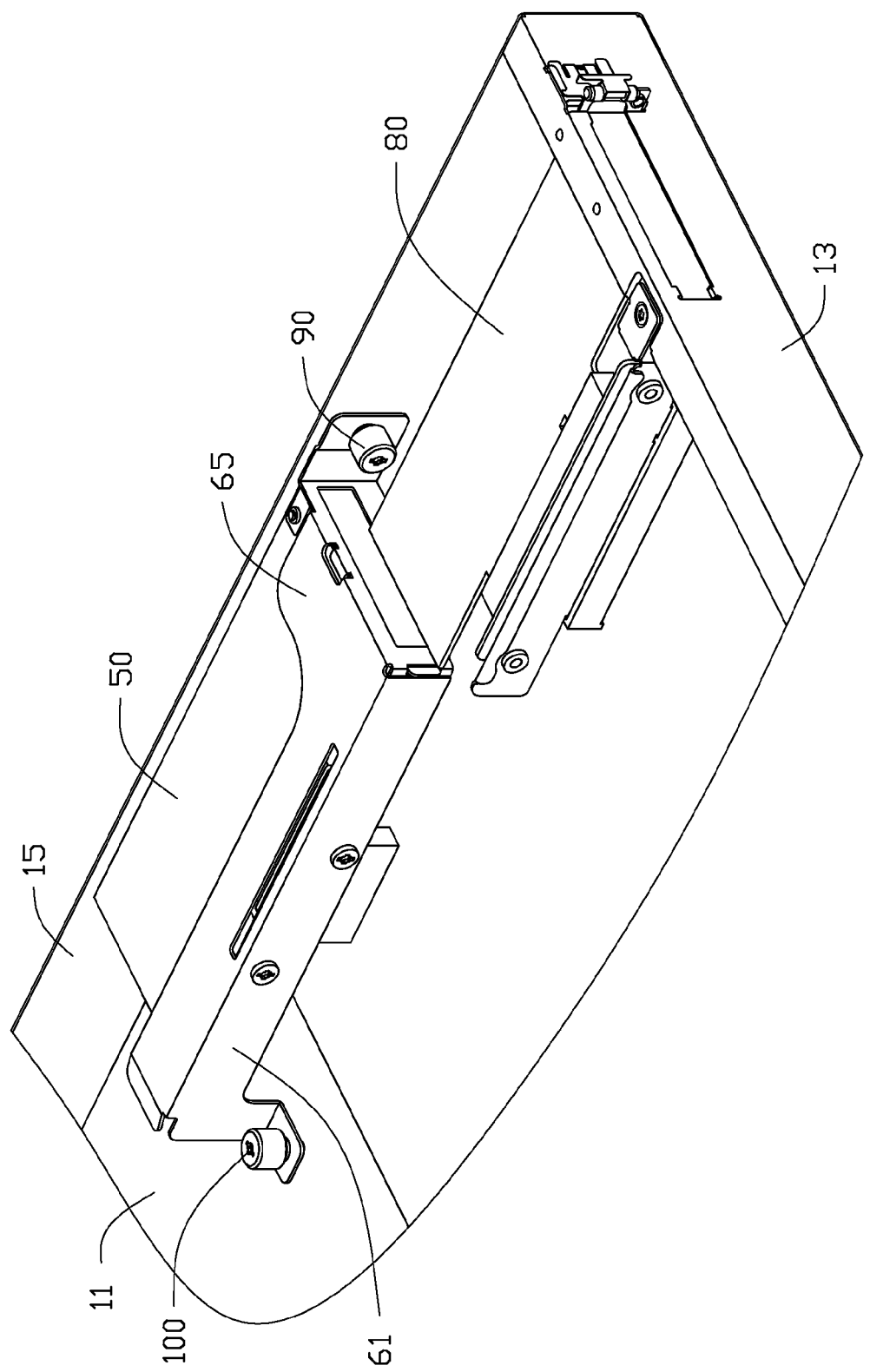
FIG. 4 is an assembled view of the electronic device of FIG. 1.

Referring to FIG. 4, in assembly, the riser card 30 is perpendicularly inserted in the socket 21 of the motherboard 20. The mounting bracket 60 is disposed in the chassis 10. The first expansion card module 50 is located above, and the card body 51 is parallel to the motherboard 20. The first expansion card module 50 is accommodated in the mounting bracket 60. The top wall 65 of the mounting bracket 60 abuts the first expansion card module 50. The finger portion 53 of the first expansion card module 50 is coupled to the riser card 30, to electrically connect the first expansion card module 50 to the motherboard 20. The base 71 of the fixing piece 70 is inserted in the slot 633 of the mounting bracket 60, abuts the supporting flange 637, and is blocked by the blocking tab 635. The bent tab 73 of the fixing piece 70 abuts the pressing portion 681 of the second mounting seat 68. A first fastener 90 extends through the second seat hole 6831 and the second post hole 1510 to secure the mounting bracket 60 to the chassis sidewall 15, so that the bent tab 73 of the first expansion card module 50 is sandwiched between the chassis sidewall 15 and the pressing portion 681 of the second mounting seat 68.

The first securing seat 67 of the mounting bracket 60 abuts the chassis bottom wall 11. A second fastener 100 extends through the first seat hole 671 and the first post hole 1121 to secure the mounting bracket 60 to the chassis bottom wall 11. The second securing seat 68 of the mounting bracket 60 abuts the chassis sidewall 15. Two third fasteners 110 extend through the mounting holes 611 in the first mounting wall 61 and the securing holes 31 of the riser card 30, to secure the riser card 30 to the first mounting wall 61 of the mounting bracket 60. Thus, the first expansion card module 70 is securely mounted in the chassis 10 via the mounting bracket 60. The second expansion card module 80 is disposed between the mounting bracket 60 and the chassis rear wall 13.

It is to be understood, however, that even though numerous characteristics and advantages of the embodiments have been set forth in the foregoing description, together with details of the structure and function of the present disclosure, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. An electronic device, comprising:
    a chassis having a chassis bottom wall, a chassis rear wall and a chassis sidewall, the chassis bottom wall, the chassis rear wall and the chassis sidewall perpendicular to each other;
    a motherboard secured to the chassis bottom wall, a first socket disposed on the motherboard;
    a mounting bracket secured to the chassis bottom wall and the chassis sidewall, the mounting bracket having a first mounting wall parallel to and spaced from the chassis sidewall, and a second mounting wall parallel to and spaced from the chassis rear wall;
    a first securing seat extends from the first mounting wall, and the first securing seat is secured to the bottom wall of the chassis;
    a second securing seat extends from the second mounting wall, and the second securing seat is secured to the sidewall of the chassis;
    a first riser card coupled to the first socket on the motherboard, and secured to the first mounting wall of the mounting bracket; and
    an expansion card module, one side of the expansion card module coupled to the first riser card, and an adjacent side of the expansion card module mounted to the second mounting wall of the mounting bracket.

2. The electronic device of claim 1, wherein the second mounting seat comprises a pressing portion and a securing portion, and a step portion connects the pressing portion and the securing portion.

3. The electronic device of claim 2, wherein the securing portion defines a securing hole, and a fastener extends through the securing hole to mount the securing portion to the sidewall of the chassis.

4. The electronic device of claim 1, wherein the mounting bracket further comprises a top wall perpendicular to the first and second mounting wall, and the top wall abuts the expansion card module.

5. The electronic device of claim 1, wherein the mounting bracket defines a securing slot in a joint of the first and second mounting wall, and the expansion card module comprises a fixing piece having a base and a bent tab; the base is inserted in the securing slot, and the bent tab is sandwiched between the second mounting seat and the sidewall of the chassis.

6. The electronic device of claim 5, wherein a bent blocking tab and a supporting tab extend from the second mounting wall, and the base of the fixing piece is blocked between the bent blocking tab and the supporting tab.

7. The electronic device of claim 1, wherein a second expansion card is secured in the chassis, and disposed between the mounting bracket and the rear wall of the chassis.

8. An electronic device, comprising:
    a chassis having a chassis bottom wall, a chassis rear wall, and a chassis sidewall; the chassis bottom wall, the chassis rear wall and the chassis sidewall perpendicular to each other;
    a motherboard secured on the bottom wall of the chassis, a first socket disposed on the motherboard;
    a mounting bracket located above the motherboard and spaced from the chassis rear wall, the mounting bracket comprising a first securing seat secured to the chassis bottom wall, and a second securing seat secured to the chassis sidewall;
    a first riser card coupled to the first socket on the motherboard, and secured to the mounting bracket; and
    an expansion card module accommodated in the mounting bracket and parallel to the bottom wall of the chassis, one side of the expansion card module coupled to the first riser card to electrically connect to the motherboard;
    wherein a second expansion card module is secured in the chassis, and disposed between the mounting bracket and the rear wall of the chassis.

9. The electronic device of claim 8, wherein the mounting bracket comprises a first mounting wall and a second mounting wall perpendicular to each other, the first mounting wall is parallel and spaced from the chassis sidewall, and the second mounting wall is parallel and spaced from the chassis rear wall.

10. The electronic device of claim 9, wherein a securing slot is defined at a joint of the first and second mounting wall, and the expansion card module comprises a fixing piece having a base and a bent tab; the base is inserted in the securing slot, and the bent tab is sandwiched between the second mounting seat and the sidewall of the chassis.

11. The electronic device of claim 10, wherein a bent blocking tab and a supporting tab extend from the second mounting wall, and the base of the fixing piece is blocked between the bent blocking tab and the supporting tab.

12. The electronic device of claim 8, wherein the mounting bracket further comprises a top wall perpendicular to the first and second mounting wall, and the top wall abuts a top surface of the expansion card module.

13. The electronic device of claim 8, wherein the second mounting seat comprises a pressing portion and a securing portion, a step portion connects the pressing portion to the securing portion.

14. The electronic device of claim 13, wherein the securing portion defines a securing hole, a fastener extends through the securing hole to mount the securing portion to the sidewall of the chassis.

* * * * *